(12) United States Patent
Khalili et al.

(10) Patent No.: US 6,362,127 B1
(45) Date of Patent: **\*Mar. 26, 2002**

(54) SYNTHESIS OF A CARBON-BASED CATALYST FROM SLUDGE

(75) Inventors: Nasrin R. Khalili, Naperville; Hamid Arastoopour, Downers Grove, both of IL (US)

(73) Assignee: Illinois Institute of Technology, Chicago, IL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/515,756

(22) Filed: Feb. 29, 2000

Related U.S. Application Data (63) Continuation-in-part of application No. 09/113,657, filed on Jul. 10, 1998, now Pat. No. 6,030,922.

(51) Int. Cl.⁷ .................................................. C01B 31/08
(52) U.S. Cl. ....................... 502/180; 502/182; 502/183; 502/184; 502/185; 502/423
(58) Field of Search ................................ 502/423, 424, 502/428, 430, 182, 185, 183, 184, 180

(56) References Cited

U.S. PATENT DOCUMENTS

| | | |
|---|---|---|
| 1,777,943 A | 10/1930 | Threlfall |
| 1,903,705 A | 4/1933 | Nikaido |
| 2,040,931 A | 5/1936 | Fuchs |
| 2,508,474 A | 5/1950 | Slyh et al. |
| 3,835,064 A | 9/1974 | Shinomiya et al. |
| 3,849,332 A | 11/1974 | Bailey et al. |
| 3,998,756 A | 12/1976 | Sutherland |
| 4,122,036 A | 10/1978 | Lewis |
| 4,204,979 A | 5/1980 | Hobbs et al. |
| 4,544,650 A | 10/1985 | Kinder et al. |
| 4,957,897 A | 9/1990 | Maroldo et al. |
| 5,102,855 A | 4/1992 | Greinke et al. |
| 5,162,286 A | 11/1992 | MacDowall |
| 5,304,527 A | 4/1994 | Dimitri |
| 5,460,699 A | 10/1995 | Bilan et al. |
| 5,589,599 A | 12/1996 | McMullen et al. |
| 6,030,922 A | \* 2/2000 | Khalili et al. ............... 502/424 |

\* cited by examiner

*Primary Examiner*—Stuart L. Hendrickson
(74) *Attorney, Agent, or Firm*—Pauley Petersen Kinne & Erickson (57) ABSTRACT

The synthesis of a carbon-based catalyst from sludge materials such as produced by the paper mill industry and the like is described wherein the treated material is subjected to processing including chemical activation with an appropriate metal-based activating agent, light and humidity treatment, and pyrolysis to result in a desired carbon-based catalyst.

20 Claims, 5 Drawing Sheets

SYNTHESIS OF A CARBON-BASED CATALYST FROM SLUDGE

CROSS REFERENCE TO RELATED APPLICATION

This application is a continuation-in-part application of application U.S. Ser. No. 09/113,657, filed on Jul. 10, 1998 now U.S. Pat. No. 6,030,922. The co-pending parent application is hereby incorporated by reference herein and is made a part hereof including, but not limited to, those portions which specifically appear hereinafter.

BACKGROUND OF THE INVENTION

This invention relates generally to the synthesis of carbon, particularly in an activated form, from sludge and, in particular, from waste sludge such as composed of biosolids and the like. One particular aspect of the invention relates generally to the synthesis of carbon-based catalysts, from a sludge material such as produced in paper mill processing and which catalysts may be useful or effective for removal of gaseous pollutants such as $NO_x$, $SO_2$, $H_2S$ and various organic vapors, for example, from process streams brought into contact therewith.

In view of factors such as increased relative quantities of sludge materials such as produced or formed at wastewater treatment, paper mill processing and the like facilities and limited disposal areas for such sludge materials, there is an increasing need and demand for processing techniques whereby such sludge materials can be transformed or converted into other, possibly more desirable and useful, materials.

Biosolids is the waste sludge such as produced at wastewater treatment facilities and as may result from various bioreactions. Biosolids, also sometimes called or referred to as the sludge or residue of sewage treatment processes, are typically nutrient-rich by-products of specially treated or stabilized wastewaters originating from municipalities, industries or storm water runoff, for example, and typically produced in relatively high mass rates.

Activated carbon is a frequently used adsorbent material and has virtually displaced many other materials in use as adsorbents in various solvent recovery systems. Activated carbon is a generally superior adsorbent at least in part because of desirable surface properties. The unique adsorption capability of activated carbons is generally related to such carbon materials having a high adsorption capacity and a high degree of surface porosity and such as may relate to carbon materials desirably having relatively high surface areas and significant microporous structure. In general, pores are classified by size in one of three categories or classes: micropores (pores having a width less than 2 nm), mesopores (pores having a width of 2 nm and 50 nm), and macropores (pores having a width in excess of 50 nm).

Activated carbons are used extensively for or in various industrial applications including: solvent recovery, gas refining, air purification, exhaust desulfurization, deodorization and gas separation and recovery, for example. The application of activated carbons in water treatment includes: removal of color, odor, taste or other undesirable impurities from water; treatment of domestic and industrial wastewaters; and collection and recovery of solutes such as gold and silver, for example. In addition, activated carbons have found application as catalysts in various chemical processes.

In practice, the activity as well as possibly the effectiveness of such carbon material in particular adsorbent or catalyst applications may be limited by either or both the surface area and porosity of the activated carbon material. The production or formation of such activated carbon material from selected chemical processing waste streams has been generally limited or restricted due to limitations in either or both the surface area and porosity of the resulting activated carbon material.

Thus, there is a need and a demand for economical and environmentally sound solutions to biosolids management and reuse at treatment facilities at various locations in the world. In particular, there is a need and a demand for techniques whereby such raw material or wastewater streams can be processed or otherwise treated such as to produce or form activated carbon of either or both increased surface area and increased microporosity. Further, there is a need and a demand for activated carbon having either or both increased surface area and increased microporosity and such as formed from such process streams.

Further, the possible or potential uses of waste sludges such as produced by or resulting from the paper mill industry have, in practice, been relatively limited. As a result, such sludges may create or result in significant disposal problems and concerns as, for example, the associated expenses can be significant. In view of the above, there is a need and a demand for an economical and efficient approach for the recycling or use of waste sludges such as produced by the paper mill industry, for example.

SUMMARY OF THE INVENTION

A general object of the invention is to provide an improved method for producing activated carbon.

Another general object of the invention is to provide an activated carbon of high surface area and microporosity such as formed from a carbon-containing sludge raw material.

Yet another general object of another aspect of the invention is to provide an improved method for producing carbon-based catalysts and, in particular, an improved synthesis of carbon-based catalysts from sludge material.

A more specific objective of the invention is to overcome one or more of the problems described above.

A general object of the invention can be attained, at least in part, and the invention encompasses in accordance with one embodiment a specified method for producing activated carbon from a carbon-containing sludge raw material. Such method includes a pretreatment step of drying a carbon-containing sludge followed by crushing and sieving to form a dried sludge material. The dried sludge material is chemically activated to form a chemically-activated sludge material which is crushed and dried to form a dry crushed chemically-activated material. The dry crushed chemically-activated material is subjected to high energy light activation in an environment having a relative humidity of at least 50 percent to form an energy-treated chemically-activated sludge material. The energy-treated chemically-activated sludge material is pyrolyzed at an elevated temperature effective to form a pyrolyzed sludge material of increased microporosity which is cooled, crushed, rinsed, dried and then physically activated forming the activated carbon.

The prior art fails to provide as simple, economical and environmentally sound solution as desired to the management and reuse of sludge materials such as biosolids at treatment facilities at various locations in the world. More particularly, the prior art fails to provide for the synthesis of activated carbon of either or both increased surface area and increased microporosity from sludge materials such as composed of biosolids and the like._

The invention further comprehends a method for producing activated carbon from a carbon-containing biosolids sludge raw material. In accordance with one such method, a carbon-containing biosolids sludge is dried, crushed and sieved to form a dried sludge material. An aqueous solution of a metal-based chemical activation agent is added to the dried sludge material to form a chemically-activated sludge material containing at least a portion of the metal of the chemical activation agent. The chemically-activated sludge material is crushed and dried to form a dry crushed chemically-activated material. The dry crushed chemically-activated material is exposed to light having an average intensity of 50 microwatts and in an environment having a relative humidity of about 60 percent to about 70 percent to promote oxidation of metal contained within the dry crushed chemically-activated material forming a light and humidity treated activated sludge material. The light and humidity treated chemically-activated sludge material is pyrolyzed at a temperature in the range of about 775° C. and about 825° C. to form a pyrolyzed sludge material of increased microporosity. The pyrolyzed sludge material is subsequently cooled, crushed, rinsed and dried. The so processed sludge material is then treated with an activating gas to remove residual gases, followed by heating the treated pyrolyzed sludge material in the presence of the activating gas to at least partially oxidize the surface and expand the pores of the treated pyrolyzed sludge material forming activated carbon.

The invention still further comprehends activated carbon of high surface area and microporosity formed from such carbon-containing sludge raw materials using such a process.

As used herein, references to a sludge material as having a "high organic content" are to be understood to sludge materials which are composed of at least about one-third organic materials and, preferably sludge materials having an organic content in the range of about 35 to about 75 weight percent.

A general object of at least certain aspects of the invention can be attained, at least in part, through a specified method for synthesizing a carbon-based catalyst from a carbon-containing sludge raw material. Such method, in accordance with one specific embodiment of the invention, includes the steps of:

drying, crushing and sieving a carbon-containing sludge to form a dried sludge material;

chemically activating the dried sludge material with at least one metal-based activating agent to form a chemically-activated sludge material;

drying and crushing the chemically-activated sludge material to form a dry crushed chemically-activated material;

exposing the dry crushed chemically-activated material to light in an environment having a relative humidity of at least 50 percent to form a light-treated chemically-activated material;

pyrolyzing the light-treated chemically-activated material at an elevated temperature effective to form a pyrolyzed material of increased microporosity, as compared to the light-treated chemically-activated material prior to pyrolysis; and cooling, crushing, rinsing and drying the pyrolyzed material to form the carbon-based catalyst.

The prior art generally fails to provide an approach for the recycling or use of waste sludges and such as results, produces or supplies carbon-based catalysts in a manner as economical and efficient as may be desired. In particular, the prior art generally fails to provide a method for synthesizing a carbon-based catalyst from a carbon-containing sludge raw material, such as produced by the paper mill industry, for example, and which catalyst may be effective in the reduction or removal of one or more gaseous pollutants such as $NO_x$, for example, from a process stream appropriately brought into contact therewith.

The invention also comprehends a method for synthesizing a carbon-based $NO_x$ reduction catalyst from a carbon-containing sludge raw material. In accordance with one specific embodiment of the invention, such a method includes the steps of:

drying, crushing and sieving a carbon-containing sludge to form a dried sludge material;

chemically activating the dried sludge material with a $NO_x$ reduction chemical activating agent which includes a first metal-based activating agent which includes zinc and a second metal-based activating agent which includes iron to form a chemically-activated sludge material;

drying and crushing the chemically-activated sludge material to form a dry crushed chemically-activated material;

exposing the dry crushed chemically-activated material to light in an environment having a relative humidity of at least 50 percent to form a light-treated chemically-activated material;

pyrolyzing the light-treated chemically-activated material at an elevated temperature effective to form a pyrolyzed material of increased microporosity, as compared to the light-treated chemically-activated material prior to pyrolysis; and cooling, crushing, rinsing and drying the pyrolyzed material to form the carbon-based $NO_x$ reduction catalyst.

Other objects and advantages will be apparent to those skilled in the art from the following detailed description taken in conjunction with the appended claims and drawings.

DETAILED DESCRIPTION OF THE INVENTION

The present invention generally provides an improved method for producing activated carbon as well as an activated carbon of high surface area and microporosity such as formed from a carbon-containing sludge raw material.

Figure 1:
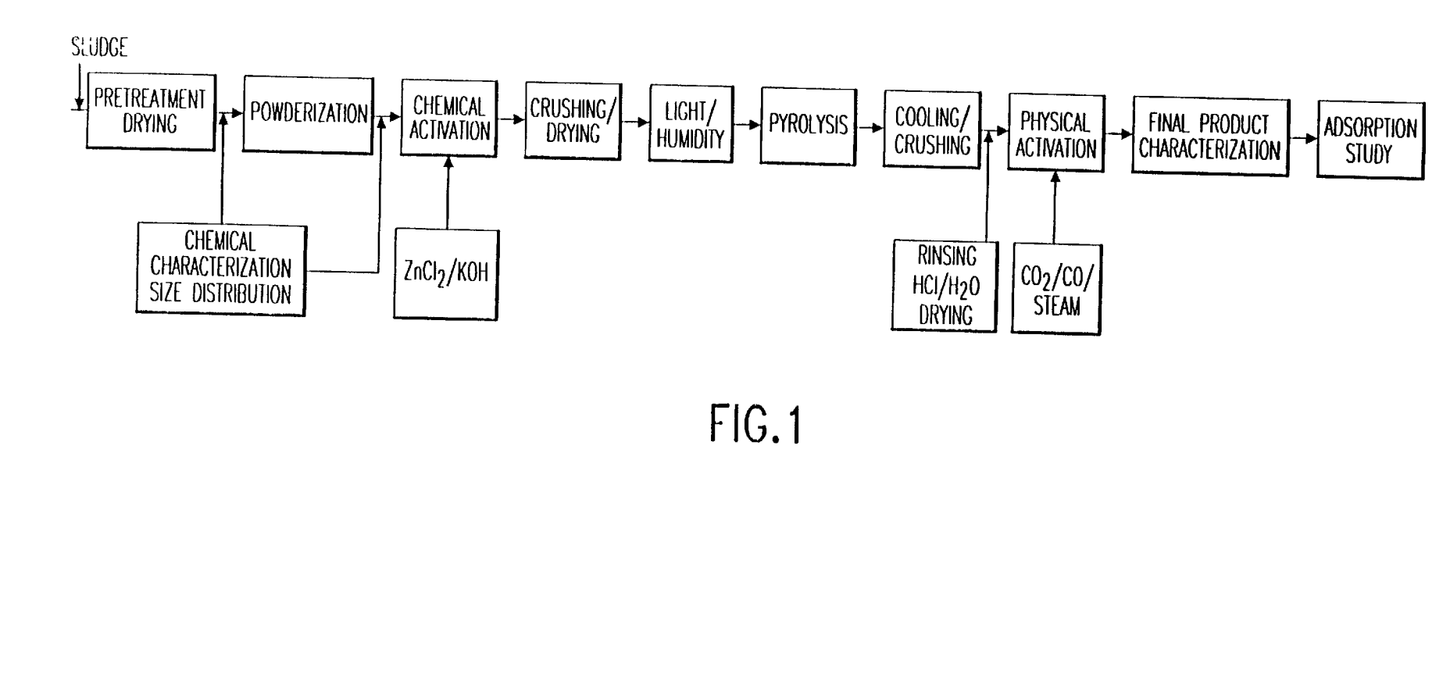
FIG. 1 is a simplified process flow diagram, in accordance with one embodiment of the invention, for the formation of activated carbon from a sludge material.

Referring to FIG. 1, a simplified flow diagram of a process for the formation of activated carbon from a sludge material in accordance with one embodiment of the invention is shown. As shown, the sludge is processed by first being dried. Such drying serves to reduce or minimize the water content of the material being processed. Further, such drying desirably results in a dried sludge material of greater uniformity and consistency, at least with respect to moisture content, regardless of the source of the sludge material.

The dried sludge material is then crushed or powderized, followed by sizing such as by being sieved. In practice, particles sized between 88 and 590 microns are desirably selected as such sized particles are generally small enough to properly and more completely react with a chemical activation agent, such as described below, while being large enough to minimize or avoid dust problems upon subsequent processing.

The sized, dried sludge material then undergoes chemical activation. Such chemical activation is typically effected by the addition of a chemical activation agent to the sludge material being processed. Chemical activation agents useful in the practice of the invention typically are metal-based and may, desirably be added to the sludge material being processed in the final form of an aqueous solution.

Useful or desirable chemical activation agents may include zinc chloride and potassium hydroxide, for example. Further, such chemical activation agents desirably can be added to the sludge material being processed in the form of a 5 molar aqueous solution, for example.

Such chemical activation agents can serve to bind sludge components, such as metals, into the sludge matrix such that upon subsequent removal of such metals, holes or pores remain in the so processed material. Further, the addition of such an aqueous solution of a metal-based chemical activation agent may also serve to at least in part hydrate the material being processed such that during subsequent pyrolysis treatment, steam generation can occur. As described in greater detail below, such steam generation may desirably contribute to enhancing the porosity of the processed material.

The chemically-activated sludge material then undergoes crushing and drying, followed by light and humidity treatment. More specifically, the dry crushed chemically-activated material is subjected to high energy light activation while in an environment having a relative humidity of at least 50 percent, preferably in the range of about 60 percent to about 70 percent, to form an energy-treated chemically-activated sludge material. In practice, exposure to light having an average intensity of at least about 50 microwatts at room temperature for a duration of about 22 hours has been found to result in a product having increased surface area.

While the mechanics by which such high energy activation produces or results in such increased surface area are not currently known, it is hypothesized that the high energy of such light exposure promotes oxidation, such as of zinc if zinc chloride has been used as a chemical activation agent. Such oxidation may in turn result in the formation of larger molecules (e.g., zinc oxide) within the sludge matrix, with the subsequent removal of such larger molecules leading to the material having increased surface area.

The light and humidity treated chemically-activated sludge material then undergoes pyrolysis treatment at an elevated temperature such as effective to form a pyrolyzed sludge material of increased microporosity. In practice, pyrolysis temperatures in the range of greater than about 750° C. and less than about 850° C., preferably about 775° C. and about 825° C., have been found to desirably result in processed material having a higher surface area and increased porosity as compared to similar materials pyrolyzed at temperatures outside such temperature ranges.

During such pyrolysis processing, carbon in the sludge material partially oxidizes under $N_2$ gas, leaving holes or pores in the sludge material. In addition, many of the other components present in or as a part the sludge material, including any water present therein, are melted and/or evaporated, such as may generate small gas bubbles which contribute to the microporosity of the resulting material.

Subsequent to such pyrolysis treatment, the pyrolyzed sludge material is cooled and crushed or powderized. The resulting sludge material, if desired, can be rinsed, such as with HCl followed by water and such as may be desired to remove or recover metals therefrom. For example, such rinsing may be desired to permit recovery and, if desired, reuse of zinc when, for example, a zinc-containing chemical activation agent such as zinc chloride has been used. Such a rinsed material can then be appropriately dried such as may be desired to facilitate subsequent processing.

The so processed pyrolyzed sludge material subsequently undergoes physical activation. In practice, such physical activation can typically be effected by treating the sludge material with an activating gas to remove residual gases, followed by heating the sludge material in the presence of the activating gas to at least partially oxidize the surface and expand the pores of the pyrolyzed sludge material forming the activated carbon product. More specifically, the processed sludge material can be exposed to an activating gas such as composed of $CO_2$, for example, such that the $CO_2$ can diffuse into the micropores of the sludge material and replace any residual gases which may be present therein. The sludge material can then be heated in the presence of CO and $CO_2$ such that the surface of the sludge material is at least partially oxidized and at least slightly expanded pores are developed in the activated carbon product.

As shown, and if desired, the final product can then be characterized and/or subject to adsorption study. For example and in accordance with known techniques, the product material can be exposed to nitrogen gas at various pressures and the volume of nitrogen gas adsorbed by the product measured or determined to obtain an isotherm curve. As is known, this data can be manipulated so as to obtain the surface area and pore distribution for the material under investigation.

Carbon-containing sludge raw materials which can be processed in accordance with the invention can take various forms. Criteria for choosing a carbonaceous raw material for activation and the production of an adsorbing product typically may include: the presence of minimum relative amounts of inorganics (e.g., the material produces or results in a low ash content) as well as the volume, cost, storage life and workabiltiy of the raw material. The practice of the invention in the processing of a sludge raw material which has a high organic content is generally particularly preferred as a high organic content raw material is generally more conducive to forming activated carbon for such uses as an adsorbent or catalyst.

Examples of sludge materials having high organic contents which are believed to be particularly suited for processing in accordance with the invention include biosolids and cellulosic paper mill sludge. As identified above, biosolid sludge typically has a high carbon content. In addition, biosolid sludge typically has a very low ash content, is available in relatively large quantities at relatively low cost, typically improves in properties with age due to anaerobic and aerobic digestion, and is available in many different specific compositional forms based on water, nitrogen, phosphorus and/or metal content. Typical biosolid materials are reported to have a BTU/lbm value in the range of 8000–10000.

The activated carbon materials produced in accordance with the invention can find extensive application in removing organic and inorganic materials and pollutants from various process streams such as including various industrial and municipal waste streams. Possible process stream applications for such sorbent materials may include gas phase adsorption of pollutant gases such as nitrous oxide, sulfur compounds, and volatile organic compounds (VOC's) as well as liquid phase adsorption of various organic pollutants. As will be appreciated, sorbent products produced via the invention can, if desired, be used instead of commercially available carbons at typically greatly reduced costs.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1–5

A sample of biosolids sludge material was collected, after aerobic digestion, at a wastewater treatment facility from the centrifuge. The composition of the sludge sample was analyzed and selected analytic results for the dried centrifuge cake starting material are shown in TABLE 1, below.

TABLE 1

| Component | Mass % of Sample |
| --- | --- |
| Loss on Drying | 2.54 |
| Carbon | 36.59 |
| Hydrogen | 5.09 |
| Nitrogen | 5.84 |
| Sulfur | 0.95 |
| Total Halogens as Cl | <0.5 |
| Ash | 28.34 |
| Oxygen (by difference) | 23.19 |
| Detected Metals (ppm) | As, Cd, Cu, Cr, Pb, Mn, Hg, Mb, Ni, Se, Zn |

Figure 2:
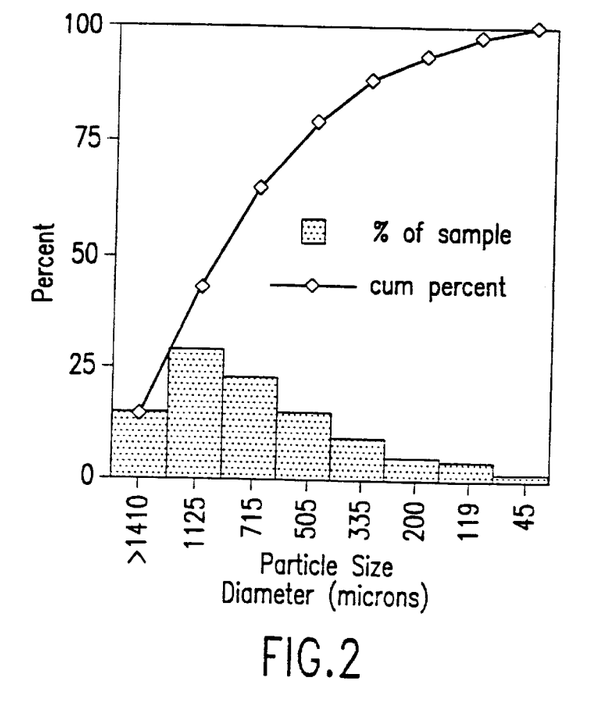
FIG. 2 is a graphical representation of the particle size distribution of the dried sludge used in Examples 1–5.

The centrifuge cake was dried at 108° C. for 24–36 hours and crushed before undergoing chemical activation. The pore size distribution of the crushed dried sludge is shown in FIG. 2. The mass average particle size was 660 microns.

Crushed and dried biosolids and anhydrous zinc chloride were mixed in a 1:1 mass ratio and water was added to make 5M $ZnCl_2$. This slurry was stirred continuously for 7 hours at 85° C., and then dried at 108° C. overnight. The resulting solid was crushed again and pyrolyzed under constant nitrogen flow at selected temperatures. The hold time at the maximum temperature was 2 hours. The heating rate was approximately 20° C./minute. After pyrolysis, the samples were crushed, rinsed with 1M HCl and distilled water to remove $ZnCl_2$, and dried. The surface area of the produced carbon-based adsorbents were evaluated using nitrogen adsorption isotherms and the BET model. Isotherm data was collected with a Coulter SA 3100 plus $N_2$-BET automatic instrument.

Results and Discussion

By varying pyrolysis temperature, with one type of chemical activation agent and one type of sludge, the effects of temperature on the production of activated carbon were assessed. These effects were shown on the overall surface area, the adsorption isotherms, and the pore size distribution.

A. Surface Area

The results showed that surface area for the produced carbons was highly influenced by pyrolysis temperature. TABLE 2, below, shows the measured $N_2$-BET surface area for carbons produced at select pyrolysis temperatures. As shown in TABLE 2, the surface area increased with pyrolysis temperature up to 750° C. and then leveled off and began to decrease at 850° C. Two separate mechanisms are believed to be responsible for the increase in surface area. First, pores were generated due to gas evolution during initial increases in temperature. Also, as temperature increased, the larger pores partially closed, causing a shift from larger pores to smaller ones.

TABLE 2

| Example | Pyrolysis Temperature (° C.) | BET Surface Area (m²/g) |
| --- | --- | --- |
| 1 | 650 | 208 |
| 2 | 700 | 572 |
| 3 | 750 | 648 |
| 4 | 800 | 652 |
| 5 | 850 | 569 |

B. Adsorption Isotherms

Figure 3:
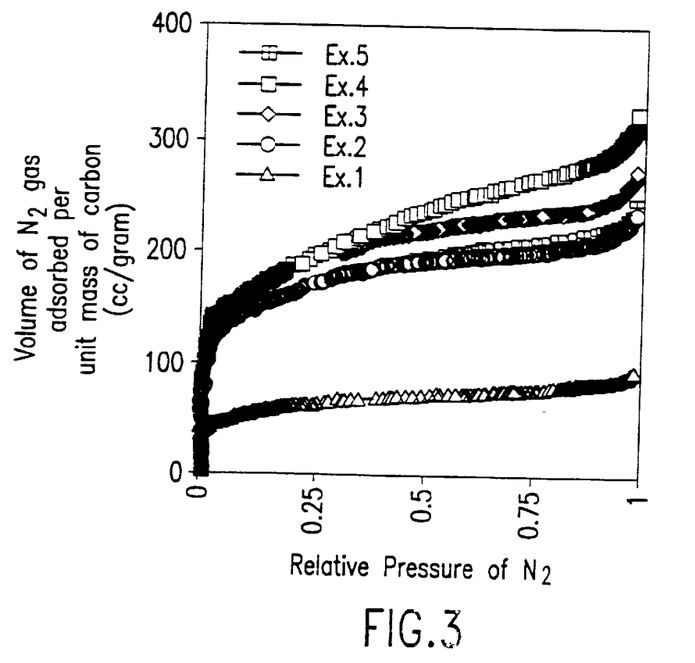
FIG. 3 is a graphical representation of the nitrogen adsorption isotherms corresponding to each of Examples 1–5.

FIG. 3 shows the nitrogen adsorption isotherms for the carbons produced in this study. It is clear that the adsorption capacity of the carbon increased with temperature up to 800° C. (Examples 1–4), and decreased as temperature was increased thereafter (Example 5). The total volume adsorbed by each carbon increased with temperature at all partial pressures, except in Example 5. This indicates that at 850 ° C., the adsorption capacity of the product began to attenuate.

The shapes of the five isotherm curves were very similar, representing a Type 4 isotherm, as defined by Gregg and Sing in *Adsorption, Surface Area, and Porosity*, Academic Press, London (1982). A Type 4 isotherm indicates microporous and mesoporous material. As temperature increased, the higher slope for adsorption curves at relative pressures greater than 0.4, was a result of formation of mesopores. The knee in the isotherm became less defined as the temperature increased to 800° C. (Example 4). This result can be interpreted to indicate that there was less distinction between micropores and mesopores because some micropores expanded and entered the mesopore range. However, at the same time, more micropores were formed, causing an increase in microporosity at higher pyrolysis temperatures. This conclusion is supported by the pore size distribution data.

C. Pore Size Distribution

The effect of temperature on pore development can be examined further by observing the changes in pore size distribution with temperature, as reported in TABLE 3, below.

TABLE 3

| Pore size (nm) | Ex. 1 | Ex. 2 | Ex. 3 | Ex. 4 | Ex. 5 |
|---|---|---|---|---|---|
| % of pores <6 | 22.17 | 27.1 | 29.9 | 37.0 | 33.9 |
| 6–8 | 8.13 | 6.87 | 6.78 | 9.79 | 7.38 |
| 8–10 | 4.43 | 3.73 | 3.32 | 4.15 | 3.42 |
| 10–12 | 5.29 | 4.04 | 3.64 | 3.95 | 3.99 |
| 12–16 | 7.02 | 5.18 | 4.68 | 4.20 | 4.44 |
| 16–20 | 7.74 | 6.11 | 5.72 | 4.56 | 5.20 |
| 20–80 | 30.5 | 29.8 | 29.5 | 21.4 | 27.3 |
| over 80 | 14.7 | 17.2 | 16.5 | 15.0 | 14.3 |

In these examples, the pores in the under 6 nm range increased with increasing pyrolysis temperature up to 800° C. Based on conventional classification, this range includes both micropores and some mesopores. When the pyrolysis temperature was increased to 850° C. (Example 5), the total surface area and percent of these small pores decreased. It is believed that micropores were expanding to become mesopores. The decrease in microporosity is accompanied by an increase in the percentage of pores in the 20–80 nm range.

Conclusions

Biosolids produced at a municipal wastewater treatment plant can be used as a precursor to produce a carbon-based adsorbent. The effect of temperature during pyrolysis was evaluated. It was shown that the surface area increases and the number of pores under 6 nm increased as pyrolysis temperature increased to 800° C. Further increasing the temperature resulted in a decrease in microporosity.

In choosing an optimal pyrolysis temperature, both minimizing energy costs and maximizing surface area must be considered. Clearly, Examples 3 and 4, with surface areas at approximately 650 m²/g, represented a maximum surface area which could be obtained under experimental conditions. Depending on the application proposed for the carbon, Example 4, with greater porosity under 6 nm, may be better suited. However, based on energy costs, pyrolysis at 750° C., Example 3, may be preferred.

Examples 6 and 7

To highlight the significance of the inclusion of the light and humidity activation in the subject processing scheme, two samples of a biosolid sludge material were used. The first sample, i.e., Example 6, was subjected to processing in accordance with the above-described FIG. 1 including exposure to light at an average intensity of 50 microwatts at a relative humidity of 63% for a duration of 22 hours. The second sample, i.e., Example 7, was subjected to the same treatment and conditions except it did not undergo light and humidity activation as it was not so exposed to light and humidity.

The BET surface area (reported in m²/gram) and the microporosity (reported in percentage of all pores) of the final carbon products obtained in Examples 6 and 7 were then determined, as described above. These results are reported in TABLE 4, below.

TABLE 4

| Example | BET Surface Area | Microporosity |
|---|---|---|
| 6 | 613 | 24 |
| 7 | 568 | 24 |

Discussion of Results

As shown in TABLE 4, the inclusion of the step of light and humidity activation treatment in the subject processing scheme resulted in a dramatic increase (i.e., an increase of about 8%) in the surface area of the final product, as compared to the product of the same treatment and conditions except it did not undergo such light and humidity activation treatment. As described herein and as appreciated by those skilled in the art, such higher surface area carbon material can provide various product advantages and is thus believed to provide a significant benefit to the specified processing scheme.

One particular aspect of the invention generally relates to the synthesis of carbon-based catalysts from sludge material. As detailed below, such catalysts may in accordance with certain preferred embodiments of the invention be particularly useful or effective for the removal or treatment of gaseous pollutants such as $NO_x$, $SO_2$, $H_2S$ and various organic vapors, for example, from flue gas or process streams brought into contact therewith.

In general accordance with the invention, a number of unit operations and unit processes are involved in such production of carbon-based catalysts. These processes are primarily responsible for the composition, characteristics and the catalytic properties of the resulting catalysts. In such catalyst preparation, carbon is desirably impregnated with one or more desired, suitable or otherwise appropriate activating agent during synthesis as it was believed that impregnating with the desired activating agent salt during chemical activation rather than after the production may assist in avoiding blockage of pores in the base material and thus provide a catalyst material with a more uniform distribution of active sites on the carbon surface. Alternatively, chemical impregnation may, if desired, occur upon production of the activated carbon.

Thus, in accordance with one preferred embodiment of such synthesis, a carbon-containing sludge raw material is dried, crushed and sieved, as described above, to form a dried sludge material. The dried sludge material is subsequently chemically activated to form a chemically-activated sludge material. The chemically-activated sludge material is subsequently dried and crushed to form a dry crushed chemically-activated material. The dry crushed chemically-activated material is subsequently exposed to light in an environment having a relative humidity of at least 50 percent to form a light-treated chemically-activated material. The light-treated chemically-activated material is subsequently pyrolyzed at an elevated temperature effective to form a pyrolyzed material of increased microporosity, as compared to the light-treated chemically-activated material prior to pyrolysis. The pyrolyzed material is subsequently cooled, crushed, rinsed and dried to form the desired carbon-based catalyst.

In accordance with one particular preferred embodiment of this aspect of the invention, such a method or production produces, forms or otherwise results in a carbon-based catalyst from a carbon-containing sludge raw material, such as a paper mill industry sludge raw material. As detailed below, such a catalyst is generally useful or effective in the reduction or otherwise removal of the gaseous pollutant $NO_x$. In such method, subsequent to drying, crushing and sieving, the dried sludge material is chemically activated with a $NO_x$ reduction chemical activating agent to form a chemically-activated sludge material.

$NO_x$ reduction chemical activating agents useful in the practice of the invention desirably may include at least one metal-based activating agent such as includes one or more of the following metals: zinc, iron, copper, vanadium, chromium, titanium, rhodium, palladium and transition metals. As will be appreciated by those skilled in the art and guided by the teachings herein provided, the selection of an appropriate such chemical activating agent may typically involve a balancing of effectiveness of a particular chemical activating agent with the cost associated therewith. For example, while the use of a vanadium oxide activating agent may be particularly effective in the formation of a catalyst effective in $NO_x$ reduction, the costs of such an activating agent may make such a catalyst economically unattractive for widespread use.

In view of the above and in accordance with one preferred embodiment, the invention desirably utilizes a combination of a first metal-based activating agent which includes zinc and a second metal-based activating agent which includes iron. While such a combination may include such first and second metal-based activating agents in various appropriate or otherwise suitable ratios such as zinc to iron in a general molar ratio range between 0 and 2.7, those catalysts resulting in a zinc to iron ratio of about 1 to about 2.2 are believed to be particularly effective for use in $NO_x$ reduction, in accordance with the invention.

The invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 8–11

To produce the catalysts of these examples, paper mill sludge was initially dried, crushed, and sieved prior to chemical impregnation. Chemical impregnation was carried out for 7 hours at 80° C. During the chemical impregnation, the weight ratio of the dried sludge to that of the impregnating agents, i.e., activating agents, was kept constant (about 25%), however, the ratio of impregnating agents viz., zinc chloride to iron nitrate, was varied as shown in TABLE 5, below, to permit an evaluation of the impact of iron concentration on catalytic properties of the produced catalysts.

Upon completion of chemical impregnation, the respective samples were dried in an oven at 110° C. for 24–36 hours. After drying, the samples were each crushed into fine powder and were later exposed to the atmosphere for 22 hours at room temperature, as described above. Pyrolysis of each of the samples was conducted at 750° C. for 2 hours in an inert environment (i.e., in the presence of $N_2$ gas). Upon completion of the pyrolysis, the produced catalysts were, respectively, removed from the reactor and then crushed using a mortal and pestle. For Examples 9–11, the respective catalyst samples were then further rinsed with a 1 molar solution of hydrochloric acid and water and then dried.

Determination of the Surface Physical Properties

Figure 4:
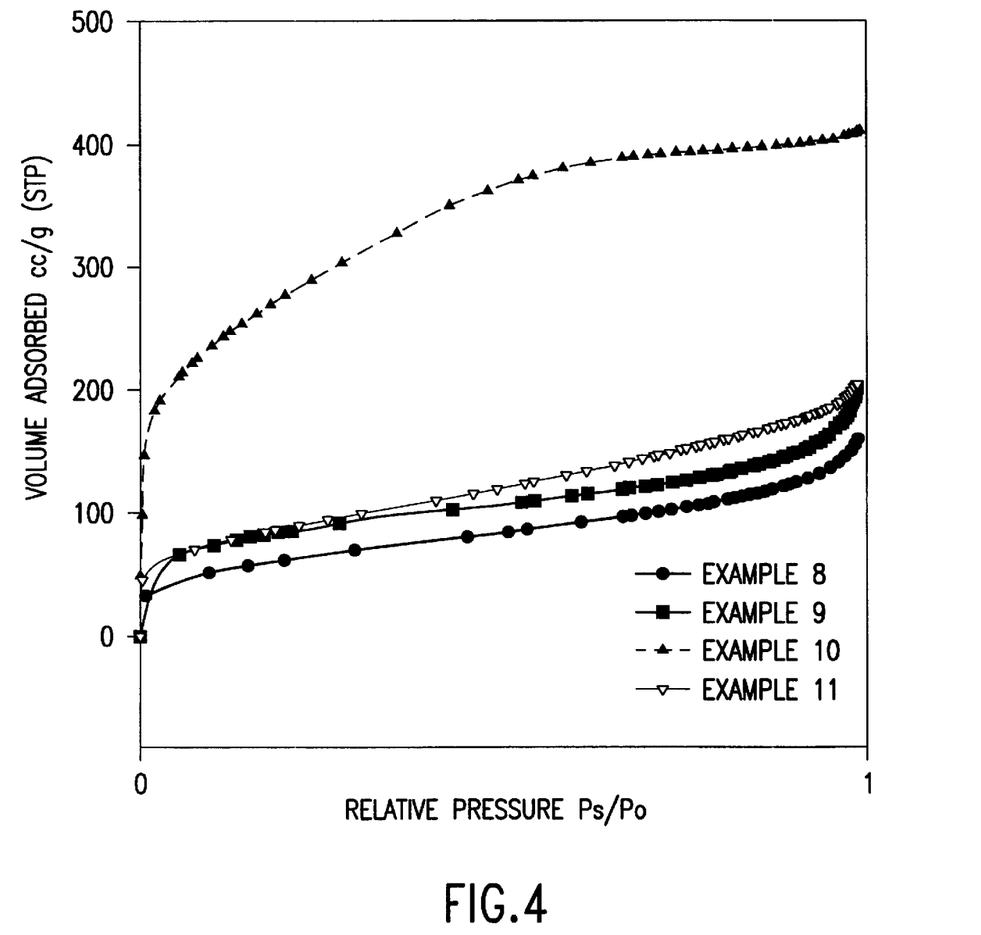
FIG. 4 is a graphical representation of the nitrogen adsorption isotherms corresponding to each of Examples 8–11.

FIG. 4 shows the nitrogen adsorption isotherms obtained for the catalyst samples of Examples 8–11. The surface physical properties of the produced catalysts including surface area, and the extent of micro- and mesoporosity were evaluated applying the Brunauer, Emmet and Teller (BET) model to the $N_2$-adsorption isotherm data. It was assumed that the surface area, A, was related to the monolayer capacity by the simple equation $A=n_m a_m L$, where $a_m$ is the average area occupied by a molecule of the adsorbate in the completed monolayer and L is the Avogadro constant, taking 0.162 $nm^2$ as the cross-sectional area of a nitrogen molecule.

The surface physical properties for the catalyst samples of Examples 8–11 are also shown in TABLE 5, below.

TABLE 5

| Example | Zn:Fe molar ratio | Surface Area ($m^2$/g) | | |
| --- | --- | --- | --- | --- |
| | | BET | Micropore | Mesopore |
| 8 | 1:1* | 224 | 19.1 | 205 |
| 9 | 1:1 | 302 | 77.6 | 226 |
| 10 | no iron | 996 | 113 | 883 |
| 11 | 2:1 | 310 | 39.2 | 271 |

*catalyst produced without post-pyrolysis washing/rinsing with HCl and $H_2O$

As shown in FIG. 4, the shape of the isotherm and therefore, the estimated surface area and the level of micro- and mesoporosity varied according to the employed method of production, i.e., the relative amount of activating agents used during chemical impregnation processes. The results of the BET analysis showed that the total catalysts surface area varied between 224 $m^2$/g to 996 $m^2$/g. The highest surface area and micropore structure was observed for catalysts produced in the absence of iron salts.

Examples 12–15 and Comparative Example 1

In this testing, the effectiveness of catalysts prepared in accordance with the invention, i.e., the catalyst samples of Examples 8–11, for $NO_x$ conversion was compared relative to a comparative catalyst sample composed of fly ash extruded with alumina (Comparative Example 1).

The experimental set up consisted of a quartz reactor which had dimensions of 6.3 mm internal diameter and 52 mm height. The reactor was equipped with a mesh screen for supporting the respective catalyst samples. The reactor was placed in a furnace equipped with a temperature-programming unit. In each case, the catalyst samples underwent phase adjustment pretreatment, while in the test reactor, with $N_2$ at 50° C./min to 400° C. for 30 min prior to testing. The flow-rate of the gas entering the reactor was measured using a flow meter. The gas flow direction was either from the top or the bottom of the reactor. The fluidization and channeling effects were minimized by proper manipulation of the flow. A cyclone separator placed at the outlet of the reactor prevented any particulate from reaching the measuring instrument (e.g., a $NO/NO_x$ Analyzer). A Chemiluminescent $NO_x$ Analyzer was used to measures the concentration (in ppm) of the $NO_x$ gases exiting the reactor.

In each case, the catalyst samples underwent phase adjustment pretreatment, while in the test reactor, with $N_2$ at 50° C./min to 400° C. for 30 min prior to testing. In the testing, each of the catalyst samples was exposed to a $NO_x$ inlet concentration of 1000 ppm and at a flow rate of 90 ml/min. If not stated otherwise, carbon monoxide was used as a reducing agent. The results of the testing are provided in FIG. 5 and TABLE 6, below.

TABLE 6

| Example | Catalyst | % $NO_x$ Conversion |
| --- | --- | --- |
| Comp. Ex. 1 | Fly ash | 96 |
| 12 | Example 8 | 66 |
| 13 | Example 9 | 90 |
| 14 | Example 10 | 83 |
| 15 | Example 11 | 94 |

Figure 5:
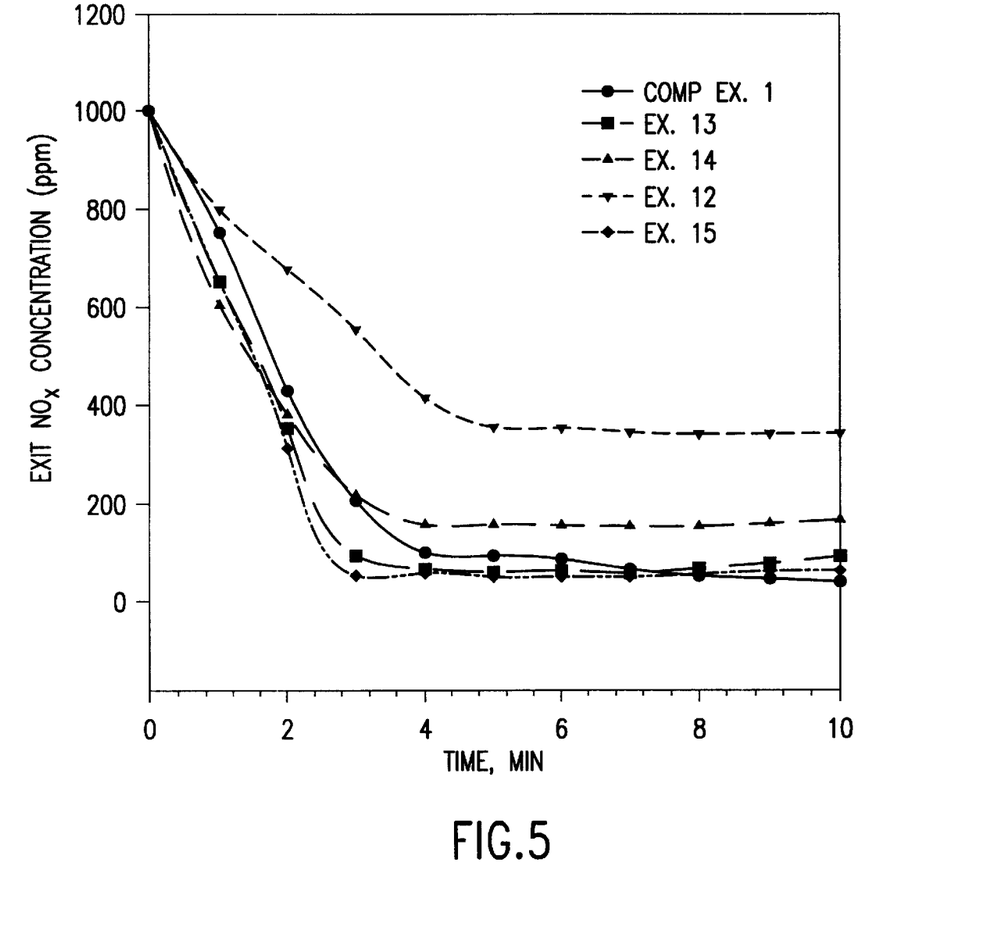
FIG. 5 is a graphical representation of the exit $NO_x$ concentration versus time performance realized in Examples 12–15 and Comparative Example 1.

As shown in FIG. 5, the catalytic capability of the catalyst samples tested varied according to the method of production and surface properties of the catalysts. As shown, the $NO_x$ reduction capacity of the catalyst samples produced from paper mill sludge was between 92–94%.

Subsequent testing has shown that the catalytic behavior of the subject catalysts, with respect to the breakthrough time, generally improved when the saturated catalysts were regenerated at 400° C., in the presence of $N_2$ gas. Such improvement in catalytic performance by the regenerated catalysts is believed related to the modification of the surface properties (i.e., pore structure) of the catalyst during the regeneration process.

Example 16

In this Example, a catalyst sample of Example 11 was pretreated with nitrogen gas at 400° C. for about four (4) hours prior to testing. The so pretreated catalyst sample was then tested in the same manner as was done in Examples 12–15 and Comparative Example 1, described above.

Figure 6:
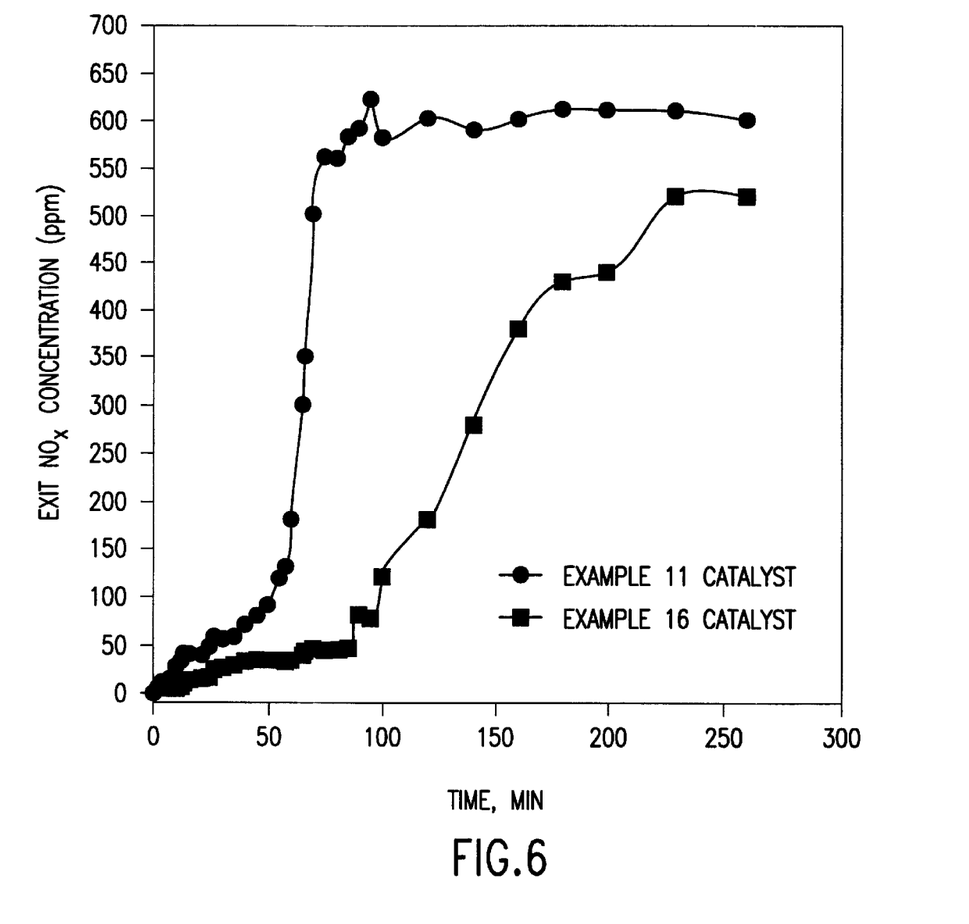
FIG. 6 is a graphical representation of the exit $NO_x$ concentration versus time performance realized using the catalyst sample of Example 16, as compared to use of the catalyst sample of Example 11.

FIG. 6 is a graphical representation of measured exit $NO_x$ concentration versus time for both the catalyst sample of Example 11 and the nitrogen-pretreated catalyst sample of Example 16. As shown, the nitrogen-pretreated catalyst sample of Example 16 provided or resulted in a significant extension of time on-stream prior to catalyst breakthrough.

While a pretreatment step of four hours in duration may be of limited commercial attractiveness, a nitrogen pretreatment of the catalysts of the invention for a minimum of 30 minutes and at a temperature in the range of about 400° C. to about 700° C. is believed useful and effective in realizing significant practical benefits in catalyst breakthrough time.

While various sludge materials, such as described above, can desirably be used, an industrial waste sludge which contains a carbonaceous structure and is free of catalytic-interfering impurities is particularly useful in the practice of such aspect of the invention. Paper mill industry sludge is, in general, one example of a suitable such sludge material for use in the practice of such aspect of the invention. In particular, such sludge generally includes or provides a strong carbon structure such as formed by or including a relatively high cellulosic structure content. Further, such sludge generally has a relatively low level or amount of impurities which might otherwise act or serve to interfere with the desired catalytic activity of the resulting product.

In addition to the inclusion or presence of desirable structure and relative purity, as compared to various other common industrial waste sludge streams, the economics and costs associated with the processing of paper mill industry sludge may make the processing of such sludge materials in accordance with the invention particularly attractive or feasible. For example, such processing may desirably serve to reduce or minimize the amount of such sludge material as would otherwise need to be carried off or otherwise used in relatively expensive landfill.

Though the invention has been described above relative to the treatment with or inclusion of chemical activating agents useful or effective for $NO_x$, the broader practice of the invention is not necessarily so limited. In particular, the invention, may if desired, be practiced using treatment with or inclusion of chemical activating agents useful for or effective in the removal or reduction of other gaseous pollutants such as $SO_2$, $H_2S$ and various organic vapors (in particular, volatile organic compounds such as acetone and hexane, for example) from process streams brought into contact therewith. For example, an appropriate or suitable catalyst for the desired reduction or removal of $SO_2$ from a process stream can, in accordance with an alternative embodiment of the invention, be formed by or result from the utilization of a copper-containing or based activating agent in the above-identified practice of the invention. In another alternative embodiment of the invention, an appropriate or suitable catalyst for the desired reduction or removal of $H_2S$ from a process stream can be formed by or result from the utilization of iron and zinc-containing or based activating agents in the above-identified practice of the invention.

Thus, the invention provides a desirable possible or potential use for waste sludges such as produced by or resulting from the paper mill industry. In particular, the invention provides an economical and efficient approach for the recycling or use of waste sludges such as produced by the paper mill industry, for example. As will be appreciated, the use of such waste materials as a precursor in the production for the subject carbon-based catalysts serves to minimize or reduce the production costs associated therewith and thus improve the commercial desirability of practice of the invention.

It is to be understood that the discussion of theory, such as the discussion of the specific mechanics by which the described processing results in the carbon product having increased surface area and increased microporosity, for example, is included to assist in the understanding of the subject invention and is in no way limiting to the invention in its broader application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for synthesizing a carbon-based catalyst from a carbon-containing sludge raw material, said method comprising the steps of:

drying, crushing and sieving a carbon-containing sludge to form a dried sludge material;

chemically activating the dried sludge material with at least one metal-based activating agent to form a chemically-activated sludge material;

drying and crushing the chemically-activated sludge material to form a dry crushed chemically-activated material;

exposing the dry crushed chemically-activated material to light in an environment having a relative humidity of at least 50 percent to form a light-treated chemically-activated material;

pyrolyzing the light-treated chemically-activated material at an elevated temperature effective to form a pyrolyzed material of increased microporosity, as compared to the light-treated chemically-activated material prior to pyrolysis; and cooling, crushing, rinsing and drying the pyrolyzed material to form the carbon-based catalyst.

2. The method of claim 1 wherein the chemical activating agent is selected to result in the carbon-based catalyst being effective in the treatment of at least one gaseous pollutant.

3. The method of claim 2 wherein the chemical activating agent is selected to result in the carbon-based catalyst being effective in the treatment of at least one gaseous pollutant selected from the group consisting of $NO_x$, $SO_2$ and $H_2S$.

4. The method of claim 3 wherein the chemical activating agent comprises a $NO_x$ reduction chemical activating agent.

5. The method of claim 4 wherein the $NO_x$ reduction chemical activating agent comprises at least one metal-based activating agent including a metal selected from the group consisting of zinc, iron, copper, vanadium, chromium, titanium, rhodium, palladium and transition metals.

6. The method of claim 4 wherein the $NO_x$ reduction chemical activating agent comprises a metal-based activating agent which includes zinc.

7. The method of claim 4 wherein the $NO_x$ reduction chemical activating agent comprises a metal-based activating agent which includes iron.

8. The method of claim 4 wherein the $NO_x$ reduction chemical activating agent comprises a first metal-based activating agent which includes zinc and a second metal-based activating agent which includes iron.

9. The method of claim 8 wherein the $NO_x$ reduction chemical activating agent comprises zinc and iron in a molar ratio of zinc to iron of less than about 2.7.

10. The method of claim 9 wherein the $NO_x$ reduction chemical activating agent comprises zinc and iron in a molar ratio of zinc in the range of about 1 to about 2.2.

11. The method of claim 1 wherein the rinsing step comprises rinsing the cooled and crushed pyrolyzed material with a 1 molar solution of hydrochloric acid and water.

12. The method of claim 1 wherein the carbon-based catalyst is further pretreated with nitrogen gas at a temperature in the range of about 400° C. to about 700° C. for a minimum of 30 minutes.

13. The method of claim 1 wherein the carbon-containing sludge raw material is free of catalytic-interfering impurities.

14. The method of claim 1 wherein the carbon-containing sludge raw material has a cellulosic structure.

15. A method for synthesizing a carbon-based $NO_x$ reduction catalyst from a carbon-containing sludge raw material, said method comprising the steps of:

drying, crushing and sieving a carbon-containing sludge to form a dried sludge material;

chemically activating the dried sludge material with a $NO_x$ reduction chemical activating agent which includes a first metal-based activating agent which includes zinc and a second metal-based activating agent which includes iron to form a chemically-activated sludge material;

drying and crushing the chemically-activated sludge material to form a dry crushed chemically-activated material;

exposing the dry crushed chemically-activated material to light in an environment having a relative humidity of at least 50 percent to form a light-treated chemically-activated material;

pyrolyzing the light-treated chemically-activated material at an elevated temperature effective to form a pyrolyzed material of increased microporosity, as compared to the light-treated chemically-activated material prior to pyrolysis; and cooling, crushing, rinsing and drying the pyrolyzed material to form the carbon-based $NO_x$ reduction catalyst.

16. The method of claim 15 wherein the $NO_x$ reduction chemical activating agent comprises zinc and iron in a molar ratio of zinc to iron of less than about 2.7.

17. The method of claim 16 wherein the $NO_x$ reduction chemical activating agent comprises zinc and iron in a molar ratio of zinc in the range of about 1 to about 2.2.

18. The method of claim 15 wherein the rinsing step comprises rinsing the cooled and crushed pyrolyzed material with a 1 molar solution of hydrochloric acid and water.

19. The method of claim 15 wherein the carbon-based catalyst is further pretreated with nitrogen gas at a temperature in the range of about 400° C. to about 700° C. for a minimum of 30 minutes.

20. The method of claim 15 wherein the carbon-containing sludge raw material is a paper mill industry sludge which has a cellulosic structure.

* * * * *